United States Patent [19]
Renard et al.

[11] Patent Number: 5,781,152
[45] Date of Patent: Jul. 14, 1998

[54] METHOD AND CIRCUIT FOR THE RECEPTION OF SIGNALS FOR POSITIONING BY SATELLITE WITH ELIMINATION OF MULTIPLE-PATH ERRORS

[75] Inventors: Alain Renard, Chabeuil; Bernard Fouilland, Fauconnieres, both of France

[73] Assignee: Sextant Avionique, Velizy Villacoublay, France

[21] Appl. No.: 767,428

[22] Filed: Dec. 16, 1996

[30] Foreign Application Priority Data

Dec. 15, 1995 [FR] France ................................. 95 14917

[51] Int. Cl.⁶ .............................. H04B 7/185; G01S 5/02
[52] U.S. Cl. ........................... 342/357; 375/208; 455/65
[58] Field of Search .................... 455/63, 65; 342/357, 342/352; 375/208

[56] References Cited

U.S. PATENT DOCUMENTS

| | | | |
|---|---|---|---|
| 3,706,933 | 12/1972 | Bidell et al. | 325/479 |
| 5,101,416 | 3/1992 | Fenton et al. | |
| 5,208,856 | 5/1993 | Leduc et al. | |
| 5,224,161 | 6/1993 | Daniel et al. | |
| 5,347,536 | 9/1994 | Meehan | |
| 5,414,729 | 5/1995 | Fenton | 375/209 |
| 5,615,232 | 3/1997 | Van Nee | 375/346 |

FOREIGN PATENT DOCUMENTS 37 43 731 7/1989 Germany.

*Primary Examiner*—Thomas H. Tarcza
*Assistant Examiner*—Dao L. Pham
*Attorney, Agent, or Firm*—Oblon, Spivak, McClelland, Maier & Neustadt, P.C.

[57] ABSTRACT

The disclosure pertains to receivers for positioning by satellite. To reduce the harmful effects of the paths reflected on the GPS measurement of position which should take account only of the path of the radiofrequency signals in direct line of sight, a method is proposed enabling the elimination of the influence of the multiple paths by simple extrapolation computation. Measurements are made by correlation with four pseudo-random codes E1, E2, L1, L2 that are replicas of a code received from a satellite. A first set of measurements of correlation energy values and of time received is carried out with the codes E1, L1 corresponding to an advance and a delay d with respect to a punctual code and a second set of measurements is carried out the codes E2, L2 corresponding to an advance and a delay k.d (k being different from 1 and 0). By linear extrapolation, a deduction is made therefrom of the measurements for k=0, which no corresponds to the case where the multiple paths have no effect. The disclosed method and circuit can be implemented with only one servo-control loop or with two independent loops.

7 Claims, 5 Drawing Sheets

METHOD AND CIRCUIT FOR THE RECEPTION OF SIGNALS FOR POSITIONING BY SATELLITE WITH ELIMINATION OF MULTIPLE-PATH ERRORS

BACKGROUND OF THE INVENTION

1. Field of the Invention

The invention relates to receivers for positioning by satellites such as GPS (Global Positioning System) receivers.

The GPS uses a constellation of satellites that rotate around the earth in very precisely determined orbits, i.e. it is possible at all times to know the position of any satellite. The satellites send out radiofrequency signals containing navigation data and codes that enable each satellite to be identified. These codes achieve the phase modulation (BPSK modulation) of a carrier frequency. A GPS receiver, on the ground or on a land, air or sea vehicle, may receive signals from several satellites simultaneously, make a precise computation of its distance from each of the satellites and make a precise deduction therefrom of its exact position in terms of latitude, longitudinal and altitude in a terrestrial reference system. It may thereby also deduce the precise date and time of reception in the temporal reference system of the GPS. Finally, it may use Doppler measurements to thereby deduce its own speed vector in the terrestrial system of references (in the case of a receiver mounted on a moving vehicle).

In the GPS, each satellite is identified by a pseudo-random code that is proper to it and that repetitively (every millisecond for example) modulates a carrier frequency sent out by the satellite. There are systems close to the GPS system, in particular the GLONASS system, in which this pseudo-random code also exists although it is not used to identify an individual satellite. The invention that shall be described is applicable directly to the GLONASS system but for greater simplicity we shall refer hereinafter only to the GPS and more specifically to the "civilian" part of the GPS which also comprises a military part to which the invention is also applicable.

The pseudo-random code is a long code (1023 bits at 1.023 MHz, that is 1 millisecond) and one of its main functions is to enable the extraction of the signal from the satellite in a noise level that is far greater (30 dB for example) than the level of the signal. This technique is now well known as the technique of spread-spectrum transmission. The signal is extracted from the noise by means of an operation of correlation, in the receiver, between the received signal and a periodic pseudo-random code identical to the one expected to be found in the signal. If the codes do not coincide temporally, there is no correlation between the received signal and the local code generated by a local code generator. If they almost coincide, there is a certain correlation, the energy of correlation being all the greater as the coincidence is more precise. It is therefore possible to set up a correlation signal that can be used to servo-control a local code generator until an exact coincidence of the local code and of the code modulating the signal sent by the satellite is obtained. A code servo-control loop then enables this coincidence to be maintained.

The pseudo-random code is transmitted by the satellite at extremely precise instants that are known in the receiver. These instants are identified, in particular, with reference to a characteristic binary transition (called an epoch) representing the beginning of the pseudo-random code every millisecond. The operation of correlation is used to determine the instant of arrival of this code in the receiver: the characteristic instant or epoch of transmission of the local code is determined and since this local code coincides with the code received when the maximum correlation is set up, this instant represents the instant of arrival of the code received. The difference between an instant of transmission of the code by the satellite and an instant of reception of the code by the receiver is used to determine a time of journey of the signals between the satellite and the receiver. As it is known that the speed of journey of the signals is the speed of light, it is possible to compute the distance between the receiver and a given satellite. The same operation performed on two other satellites makes it possible, by triangulation, to determine the exact position of the receiver. If a fourth satellite is used, the clock errors of the receiver are eliminated, as the clock of the receiver is not as precise as that of the satellite. Apart from the position of the receiver, it is possible to compute an exact time of the measurement of position in the time reference system of the GPS satellite.

The precision with which the position is determined therefore relies to a great extent on the precision with which the instant of reception of the pseudo-random code is determined. This precision itself relies essentially on the quality of the correlation operation since an instant of reception of the satellite code is measured by measuring the instant of transmission of the local code when it is correlated, with the utmost efficiency, with the code received and when it is therefore assumed to be in perfect coincidence with the received code.

2. Description of the Prior Art

The operation of correlation is a simple multiplication between the signal received (transposed to low frequency while maintaining its phase modulation) and the local code produced by a local code generator. If the codes coincide to within less than one code instant or chip, a certain level of energy of a correlation signal is provided. A "chip" is the period T between two successive bits (among 1023 bits) of the code. Within this time interval equal to 2T, the correlation signal is all the stronger as the coincidence between the codes is more precise. There is a maximum of the correlation signal for a precise coincidence between the local code and the received code.

FIG. 1 shows the function of theoretical correlation between the received code and the local code, namely the energy of the correlation signal as a function of the temporal divergence between the received code and the local code: it is zero if the codes diverge by more than one chip T early or one chip T late. It increases linearly as the temporal divergence between the codes diminishes from –T to zero and it again decreases linearly as the temporal divergence increases in the other direction from zero to +T. It remains at zero for a divergence greater than T. In this form of triangular correlation curve, the apex of the triangle represents the exact point of coincidence between the codes.

It will be understood that this triangular shape is a theoretical shape. In reality, the base and the apex of the triangle are slightly rounded, depending on the passband of the correlation circuits which is limited to varying degrees. The reasoning behind the description here below shall be based on the theoretical forms, with the invention being based on a linear approximation of these correlation curves.

The correlation operation therefore consists in making the local code slide with respect to the code received from the satellite until the correlation signal is the maximum. Once this result is obtained, the generator of the local code is servo-controlled so that the correlator continues to produce a maximum correlation peak.

In practice, it is not quite possible properly to obtain a servo-control on a maximum of a function is not well known. It is far more possible to obtain an efficient servo-control of a signal with respect to a central zero value: if a positive divergence occurs, the phase of the local code is moved ahead and if a negative divergence occurs, it is delayed.

It is therefore preferable to use correlation functions showing a zero when the coincidence of the codes is precise. There are several ways of doing this, especially by means of double correlators using not only the local code called a punctual code P that has to be made to coincide with the code received from the satellite but also an early code E whose phase is early by a short duration d (smaller than or equal to a half-chip T/2) which respect to the punctual code P and a code L or late code that is late by the same duration d with respect to the punctual code P.

If the correlation functions F(P), F(E), F(L) are plotted between each of these codes P, E, L and the signal received from the satellite, in taking the temporal divergence between the received code and the punctual code P as the x-axis value to be aligned with the received code, the triangle of FIG. 1 is found for the function F(P), and triangles that are identical but shifted to the left or to the right by a duration d are found for the functions F(E) and F(L).

FIG. 2 shows these correlation functions in the particular case where the duration d of shift between the codes is equal to a half-chip T/2. The temporal divergence 0 on the x-axis represents an exact coincidence between the received code and the punctual local code P. This graph can be read as follows: for any temporal divergence, plotted on the x-axis, it is possible to read the value of the correlation energy with each of the codes P, E and L by reading the value of the functions F(P), F(E) and F(L) for this value of divergence.

One way of creating a correlation function having a zero when the punctual code P coincides with the received code consists in establishing the correlation function F(E) of the received code with the early code E and the correlation function F(L) of the received code with the late code L and in taking the difference F(E)−F(L) between these two functions.

FIG. 3 shows this difference in solid lines, as a function of the temporal divergence between the received code and the punctual code. The correlation function F(P) with the punctual code is recalled in dashes. It is ascertained that the differential correlation function F(E)−F(L) has a zero at the position of the exact correlation with the punctual no code and that it is linear around this zero.

A simple way of determining and setting up a servo-control of the exact point of correlation with the punctual code therefore is to take the difference between the correlation signals F(E) and F(L) and servo-link the local punctual code (the codes E and L being linked to the code P) in such a way that this difference F(E)−F(L) remains at zero.

FIG. 2 has been plotted in assuming that the code L is late and the code E is early by precisely one half-chip. FIG. 3 also corresponds to this case. However, the shift d may be smaller than a half-chip. The zero remains at the same position and the linearity around zero is preserved.

Another possibility of creating a correlation function having a zero when the punctual code coincides with the received code consists in creating a difference code E−L (also called early-minus-late) on the basis of the codes E and L, and in obtaining the correlation between this difference code and the signal received from the satellite. The correlation function F(E−L) that results therefrom is practically identical to the function F(E)−F(L) of FIG. 3, and hereinafter it shall be assumed that these approaches are equivalent.

There is a known phenomenon capable of affecting the precision of the correlation and hence the precision with which the periods of time and then the distances are determined. This phenomenon pertains to radiofrequency wave multiple paths between the satellite and the receiver. The distance to be computed is the distance in the direct line of sight between the satellite and the receiver. However the radio signal received sometimes has components resulting from reflection on the surrounding surfaces, namely reflection on a building facade, on the metal no surfaces of a vessel, etc.

These reflections correspond to paths between the satellite and the receiver that are of greater length but are not necessarily long enough to come out of the zone of correlation between the codes. Typically, the correlation zone corresponds to one and a half chip at 1.023 MHz, which corresponds to about 450 m wavelength or to a fraction of a chip, which corresponds to about a hundred meters or some tens of meters. A wave reflection on a building may very well induce a secondary wave path having a difference in path length of several tens of meters with respect to the path in direct line of sight. In this case, the direct signal and the reflected signal are mixed and both play a role in the correlation function, but with different instants of exact coincidence since they correspond to different instants of arrival of the pseudo-random code sent by the satellite.

In practice, the path in direct line corresponds to a stronger signal than the reflected paths (which undergo losses at the time of the reflection as well as during the incidence on the antenna), so that the main effect of the reflected paths is that they modify the shape of the correlation function. It can easily be realized that, instead of being symmetrical and triangular, the correlation function is deformed (non-triangular) and asymmetrical.

FIG. 4 shows a typical shape of a correlation function modified by the presence of a reflection. The correlation curve F(P) in solid lines is quite simply the sum of a symmetrical triangular function Fd(P) (in dashes) corresponding to the path of the wave in direct line of sight and another symmetrical triangular function Fr(P) with a smaller amplitude (also in dashes) corresponding to the reflected path. The triangles have peaks shifted in time since the path lengths are different, and what is sought to be done is to synchronize the punctual local code with the peak of the main triangle Fd(P) corresponding to the path in direct line, to compute the direct distance between the receiver and the satellite.

Naturally, the correlation functions F(E) and F(L) with the early and late codes are affected by the same disturbance and therefore have the same shape.

In the case of these deformed correlation functions, the use of a multiple correlator E, L or P, E−L as described here above introduces an error. Indeed, the zero of the differential correlation function F(E)−F(L) or F(E−L) is no longer located at the instant for which the punctual code coincides with the received code. There is a shift between this zero and the peak of the correlation function.

This can be explained if a plotting is done of the correlation curves by the code P, the code E and the code L in the case of multiple paths where these curves are not triangular but similar to those of FIG. 4.

FIG. 5 shows these three functions. The zero of the difference F(E)−F(L) corresponds to the point of intersection A of the functions F(L) and F(E). It is not located beneath the correlation peak of the function F(P). The error is dT1. This means that the correlator believes that it has servo-linked the punctual local code to the code of the satellite whereas it has moved away from it by a fraction of a chip which may be important.

The loop of servo-control by the correlator will get locked into the point A whereas it would have been desirable for it to get locked into the peak of the function F(P). Indeed, when a GPS position is computed, the state of various digital signals of the servo-control loop are read at a given instant, in no assuming that the punctual code P is exactly synchronous with the code received from the satellite and, as a function of these signals, a time T1 corresponding to the instant of reading is computed. Now, the punctual code is not synchronous with the received code. It is shifted by a time interval dT1 with respect to the code received. The computation of the time received T1 is affected by an error dT1. The real value of time that is of interest is T0=T1−dT1, but the error dT1 which depends on multiple reflections is not known.

This error in the determining of the time may give rise to a positioning error of at least several tens of meters when the receiver computes its position on the basis of the punctual local code assumed to be synchronized with the satellite code. This error is not acceptable in very many applications, especially in the case of the static measurement of very precise positions. For receivers in motion, the deformations of correlation curve vary periodically and a smoothing operation eliminates this source of error.

The present invention relies in part on the observation that the peak of the deformed correlation function F(P) is located at the same position as the peak of the triangular correlation function Fd(P) corresponding to the path in direct line, when the reflected paths have a lower amplitude than the direct path and when there do not exist several reflected paths reaching the receiver with high amplitudes and with exactly the same phase.

SUMMARY OF THE INVENTION

According to the invention, there is proposed a simple means to then considerably reduce the harmful influence of the multiple paths and eliminate this influence sometimes completely. The method according to the invention does not require a search by successive attempts for the presence of secondary paths in order to then subtract them from the correlation function which would be a complex and lengthy operation.

There is therefore proposed a method to eliminate the influence of the multiple paths in a receiver for positioning by satellite wherein there is used a correlation by means of at least four pseudo-random codes E1, L1, E2, L2 which are the replicas of a code received from a satellite, the codes E1 and L1 being respectively early and late by a duration d with respect to a punctual code P1 and the codes E2 and L2 being respectively early and late by a duration k.d with respect to a punctual code P2, k being different from 1 and different from zero, wherein in order to deduce the position of the receiver from the temporal position of the code received without error due to multiple paths, measurements are made of correlation energy values and of at least one received time, firstly with the replica codes E1, L1 that are early and late by d, and secondly with the replica codes E2, L2 that are early and late by k.d and, on the basis of these two sets of measurements, a computation is carried out, by a simple extrapolation computation, of the temporal position corresponding to k=0 that defines the temporal position of the received code.

In other words, the invention is based on the observation that if the energy values of correlation between the received code and the codes E1, E2, L1, L2 are known, namely with two different delays d and k.d, it is possible by simple extrapolation to compute the peak of the correlation curve. With a delay d, it is possible to know two points of the correlation curve; with a delay k.d, two others are known. These four points define two segments, one to the left of the peak with a first slope, the other to the right with another slope and the upward extrapolation of these segments gives the apex of the peak (which corresponds to the extrapolation k=0).

In other words again, this means that if a servo-control loop is locked into an erroneous temporal position by means of a correlation by codes E1, L1 spaced out by 2d, a measurement of time T1 is obtained with an unknown time error dT1 but if this measurement of time is complemented by measurements made on the basis of codes E2, L2 having another spacing, namely spaced out by 2k.d with k being different from 1 and from zero, there are two sets of measurements making it possible, by simple extrapolation, to find the exact position of the correlation peak that corresponds to a value k equal to zero.

Hence, the point to which the servo-control loops would get lockeded if there were no multiple paths is deduced from two sets of measurements, using simple extrapolation and not successive approximations or empirical methods of trial and error.

Two main modes of implementation may be used: in a first mode, the codes P1 and P2 are independent of each other; two independent servo-links are created for the codes E1, L1 (with the temporal divergence of 2d) and for the codes E2, L2 (with the divergence of 2k.d), respectively giving computations of time T1 and T2 and the time T0 corresponding to k=0 is determined by the following extrapolation formula:

$$T0=(kT1-T2)/(k-1)$$

This mode of implementation may use two digital servo-control channels working simultaneously in parallel or else a single time-multiplexed channel in taking account, in the latter case, of the fact that the measurements are not made at the same time and that it is therefore necessary to deduce the time between the two measurements from the computation of time.

The other main mode of implementation uses a single servo-control loop (the punctual codes P1 and P2 are merged) with the codes E1 and L1 enabling the computation of a period of time T1 affected by an error. It also uses a measurement of correlation energy values y1, z1, y2, z2 between the received code and respectively the codes E1, L1 (early or late by d) and E2, L2 (early and late by k.d). The time T1 is computed and the time T0 corresponding to the extrapolation k=0 is determined by the following extrapolation formula:

$$T0=T1-d(y2-z2)/(y1+z1-y2-z2)$$

With the main points of the method according to the invention having thus been defined, it will be noted that the object of the invention is also a receiver for positioning by satellite comprising means to generate four pseudo-random codes E1, L1, E2, L2 that are replicas of a code received from a satellite, the codes E1 and L1 being respectively early and late by a duration d with respect to a punctual code P1 and the codes E2 and L2 being respectively early and late by a duration k.d with respect to a punctual code P2, k being different from 1 and 0, wherein it further comprises means of correlation between the received code and the replica codes, means for the measurement of correlation energy values and at least one received time, these means using firstly the replica codes E1 and L1 and secondly the replica codes E2 and L2 and means for the performance, on the basis of these two sets of measurements, of a computation by simple extrapolation of a temporal position corresponding to k=0 that defines the temporal position of the received code.

BRIEF DESCRIPTION OF THE DRAWINGS

Other features and advantages of the invention shall appear from the following detailed description made with reference to the appended drawings, of which.

MORE DETAILED DESCRIPTION

Figure 1:
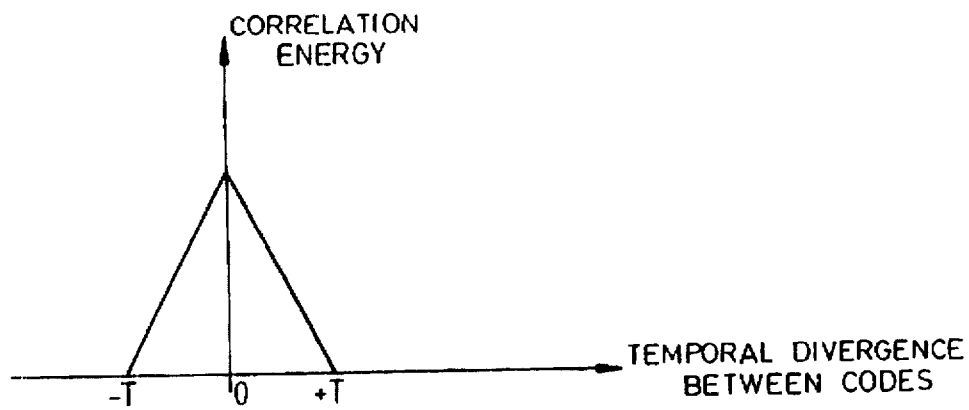
FIGS. 1 to 3 already described are graphs of correlation functions explaining the principle of the locking of a servo-control loop of the punctual local code into the code received from the satellite.
Figure 2:
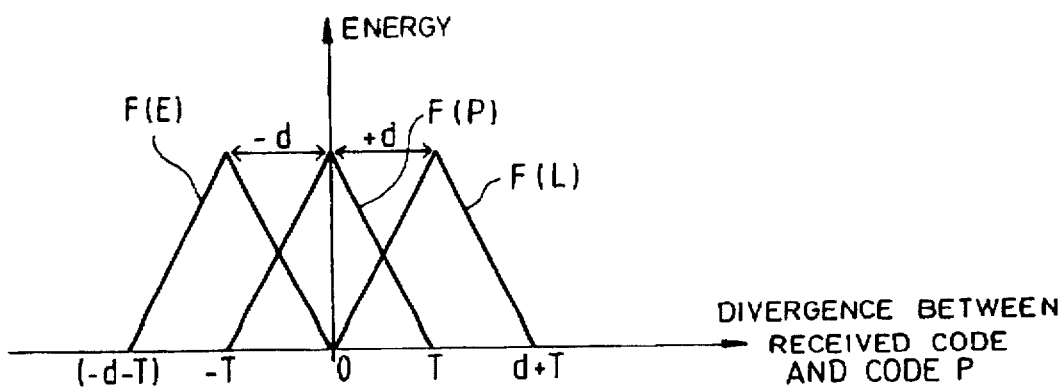
Figure 3:
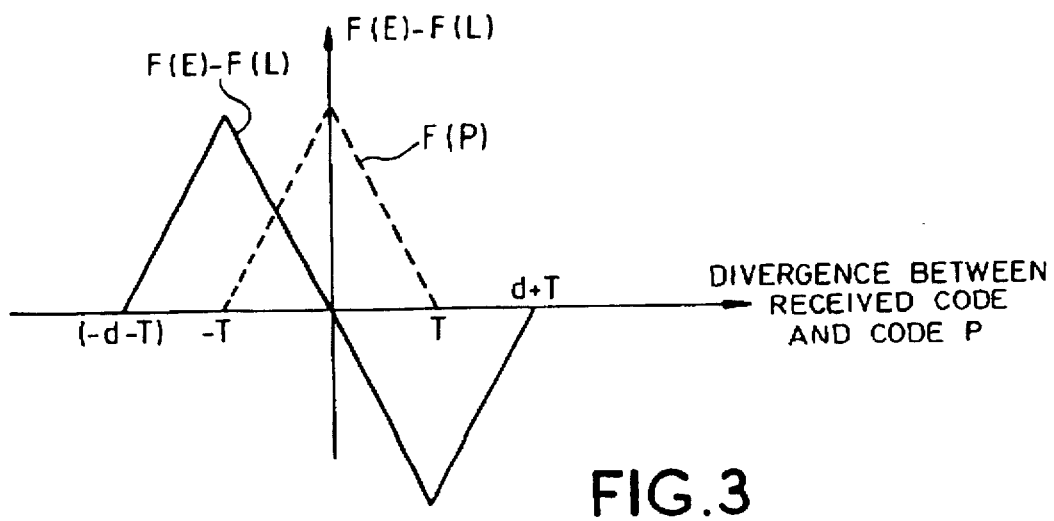
Figure 4:
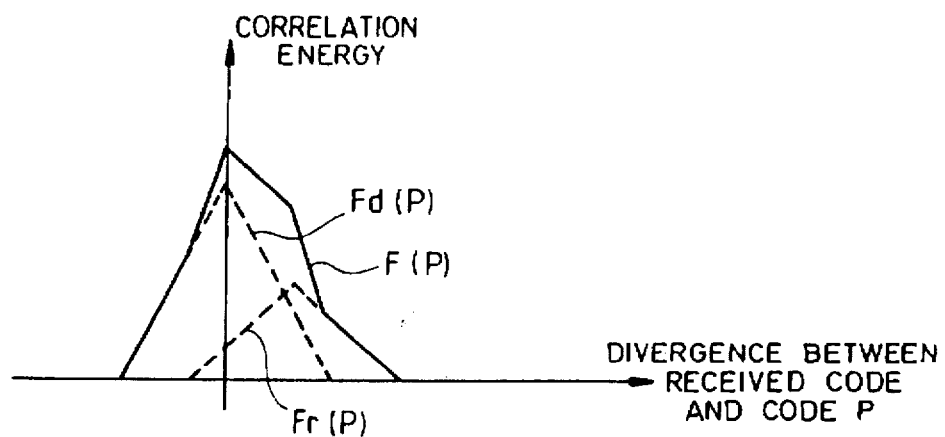
FIGS. 4 and 5 which are also already described explain the time measurement error resulting from the presence of multiple paths.
Figure 5:
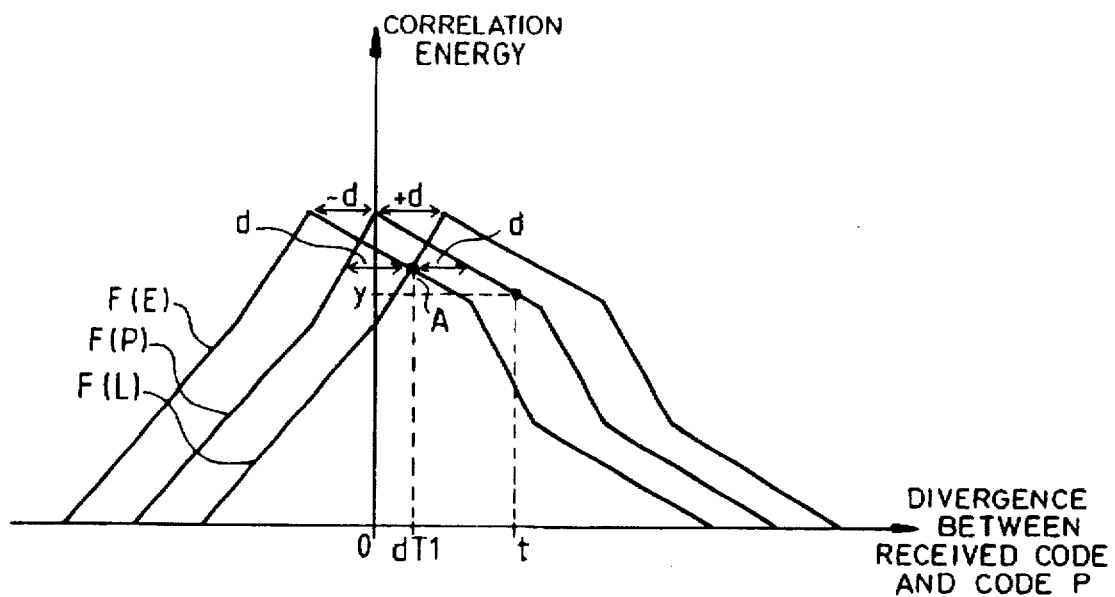

Returning to FIG. 5, it can be seen that it is not necessary to represent the correlation functions of the early and late codes F(E) and F(L): indeed it is observed that the locking point A for which the functions F(E) and F(L) are equal is located at equidistance from the two sides of the curve F(P) and more specifically that it is located at the distance d corresponding to the temporal divergence between the punctual code and the other two codes. The link-up point can therefore be represented directly as the point that is at a distance d from the two sides of the function F(P) without plotting the functions F(E) and F(L).

In this case, assuming that the servo-control loop is linked to the point A, with an x-axis value dT1, any x-axis point t and y-axis point y of the function F(P) represents the measurement of the correlation energy value y between the received code and the replica code late by t-dT1 with respect to the received code. It is therefore possible to represent the energy values of correlation of the early and late codes on the basis of the curve F(P) alone.

As stated here above, it will be assumed that the correlation is done by computation of the difference F(E)−F(L) in servo-linking this difference to zero, it being understood that it would be possible in an equivalent manner to use a correlation F(E−L) by the difference code E−L or even again other correlations by difference.

The result thereof is that if two sets of correlation codes with two different temporal divergence values d and k.d are used, k being any coefficient, two different points of locking A and B are found, corresponding to two different time errors dT1 and dT2 due to the multiple paths.

Figure 6:
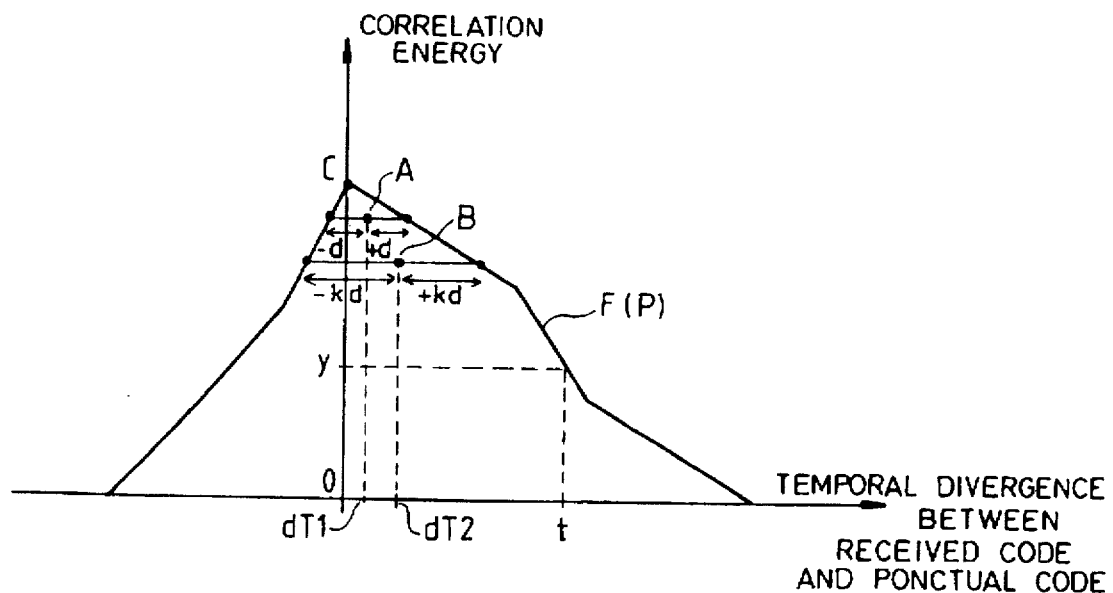
FIG. 6 gives a view, in a form of a graph of energy values of correlation in the presence of multiple paths, of the principle on which the invention is based.

FIG. 6 shows these two locking points A and B. The originality of the invention lies in the fact that a direct deduction is made, from these two points, by simple extrapolation computation, of a third point C that corresponds to k=0 for which the time error is zero and that therefore represents the exact time sought, namely the peak of the correlation function F(P). The point C is aligned with the points A and B.

More generally, it can be observed that if we know:
firstly, the x-axis values (measurement of time) and y-axis values (measurements of energy) of the two points close to the peak C, to the left of this peak,
and secondly, the x-axis values (measurement of time) and y-axis values (measurement of energy) of two points close to the peak C and to the right of this peak,
then it is possible to compute the temporal position of the peak C by simple extrapolation of two straight-line segments defined by these points.

In a first embodiment of the invention, there are two independent servo-control loops. One works with codes E1 and L1 that are early and late respectively by a period d. It uses correlation functions F(E1) and F(L1). It can be used for the computation, at a given instant of measurement, of a received time corresponding to the point A of FIG. 6, the loop being locked into this point. The computed time is a time T1. The error due to the multiple paths is an unknown value dT1, which means that the time sought is T0=T1−dT1.

The other loop works with codes E2 and L2 that are early and late by a period k.d. The coefficient k is any coefficient but is different from 0 and 1. The locking point of the loop is the point B. This second loop enables the computation of a received time T2 corresponding to the locking point of the loop. The instants of sampling of data used for the computation of time are simultaneous in both loops in order that the comparison of the times T1 and T2 will have a meaning. If they are not simultaneous, a time T'2 is computed and to find T2, the time interval between the measurement in the first loop and the measurement in the second loop is taken away from T'2. It is therefore also possible to work in multiplexing mode with a single loop using alternately the codes E1, L1 and then the codes E2, L2 provided that the time interval between the computation instants for the delay d and for the delay k.d are perfectly known. It can then be subtracted to return to the same conditions as if the sampling were to be done simultaneously in two distinct loops.

The computation error on T2, for a delay/advance k.d is dT2 and the time sought therefore is T0=T2−dT2. The error for k=1 is dT1 and the error varies linearly with k. Hence dT2/dT1=k.

With the time T1, the time T2 reduced to the same instant of measurement and the coefficient k being known, direct extrapolation is used for the deduction therefrom of the time T0 which corresponds to the signal received in direct sight of the satellite without multiple paths. The extrapolation formula is:

$$T0=(kT1-T2)/(k-1)$$

This is therefore a very simple formula especially for noteworthy values of k (k=2 for example).

Figure 7:
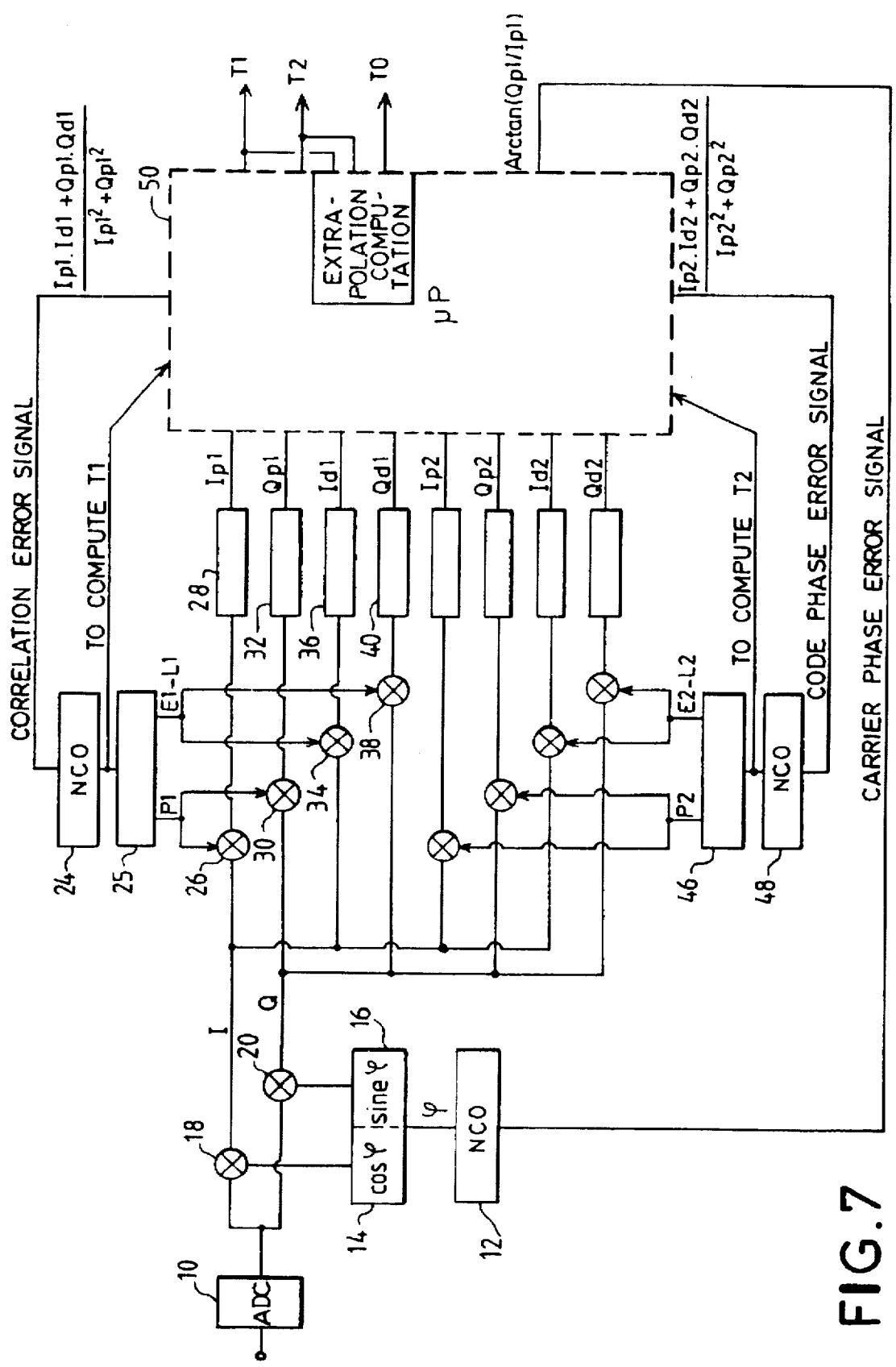
FIG. 7 shows a first mode of implementation of the invention.

FIG. 7 shows the corresponding circuit in a version with two servo-control loops without multiplexing.

The figure does not show the radiofrequency circuits necessary for the reception and frequency transposition of the signals from the satellite. The conventionally transposed signals are digitized by an analog-digital converter 10 and are applied to digital signal processing circuit comprising as many processing channels as it is sought to receive from satellites at a time. In the case of multiplexed processing, the satellites may be processed successively by one and the same channel. A single channel is shown in FIG. 7.

The channel conventionally has a double servo-control loop: carrier phase servo-control and code phase servo-control. The latter is the one used in the invention and is itself duplicated in this embodiment. The carrier phase loop does not need to be duplicated but may be duplicated if this is more convenient for practical reasons.

The carrier phase loop uses essentially a local numerically controlled oscillator 12 providing a periodic digital phase (sawtoothed) at a frequency corresponding to the transposed carrier frequency, in taking account of the Doppler effect which affects the carrier frequency transmitted by a satellite. The Doppler effect is taken into account owing to the very fact of the existence of the servo-control loops.

This digital phase is converted into two sinusoidal periodical signals in phase and in phase quadrature by circuits 14, 16 setting up the cosine and sine of this phase. Multipliers 18, 20 enable the multiplication by these sine functions of the signal received from the satellite (transposed into low frequency and preserving its phase modulation representing the pseudo-random code transmitted by the satellite with other modulation data).

The signal thus multiplied by a sine function on two channels, in phase (channel I) and in phase quadrature (channel Q) is correlated with locally produced pseudo-random codes in order to set up the code servo-control loops enabling the local codes to be servo-linked to the code received from the satellite and in order to then make it possible to determine the exact temporal position of the local codes thus servo-linked.

The first servo-control loop comprises a code generator 22 driven by a numerically controlled oscillator 24 itself receiving a code phase servo-control signal.

The code generator 22 may produce two codes E1 and L1 that are early and late by d with respect to a punctual code P1. It may also produce a code P1 and a code E1–L1, and it is the latter case that is shown.

The channel in phase I is multiplied by the code P1 in a digital multiplier 26 and then integrated (by an << integrate and dump >> type integrator 28 that is read every millisecond and reset at this instant). The output of the integrator 28 represents a level of correlation signal Ip1 corresponding to the channel in phase correlated with the punctual code P1.

Similarly, using multipliers 30, 34, 38 and integrators 32, 36, 40, the following correlation signals are produced:

Qp1, channel in quadrature correlated by the difference code E1–L1;

Id1, channel in phase correlated by the code P1;

Qd1, channel in quadrature correlated by the code E1–L1.

Conventionally, these correlation signals are used to compute a correlation error signal. The computation is done in a computation circuit which in practice is a microprocessor 50 that controls the entire signal processing circuit and carries out the computations of time and GPS position. The correlation error signal is preferably obtained by the scalar product of the two correlated vectors Ip1, Qp1 and Id1, Qd1, with a standardization term $Ip1^2+Qp1^2$ corresponding to the fact that the energy values of the signals received vary in time.

The error signal therefore has the shape:

$(Ip1.Id1+Qp1.Qd1)/(Ip1^2+Qp1^2)$

This error signal is applied to the oscillator 24 which drives the code generator 22. This error signal has a zero when the energy values of correlation by the codes E1 and L1 are equal. The servo-control loop therefore gets locked into the point A of FIG. 6. As reported here above, rather than the correlation by the difference code (E1–L1) it is possible to use the difference of the energy values of correlation F(E1) and F(L1) to produce the error signal of the servo-control loop.

The computation of GPS time received T1 is done conventionally by the reading, at each determined sampling instant, of a certain number of registers of the signal processing circuit and especially of the state of the phase of the punctual code P1, determined in practice by the state of the output of the numerically controlled oscillator 24.

Another computation is done in parallel to give a carrier phase error signal that will control the numerically controlled oscillator 12. This computation relies conventionally on the assessment of Arctan(Qp1/Ip1).

The second code phase servo-control loop which is independent of the first one uses another pseudo-random code generator 46 controlled by a numerically controlled oscillator 48. The generator produces codes E2 and L2 spaced out by k.d with respect to a punctual code P2 produced by the generator or again, as here above, a code P2 and a code E2–L2. The code P2 is identical to the code P1 but since the servo-control loops are independent, it is not synchronized with the code P1 (except where there are no multiple paths).

The second loop is identical to the first one. It receives the output digital signals of the multipliers 18 and 20, namely the signals from the satellite after the frequency transposition, analog-digital conversion and multiplication by the sine and cosine of the transposed carrier frequency reconstituted by the oscillator 12. However, it will be possible also to duplicate the elements 12, 14, 16, 18, 20 to make the two loops completely independent not only for the code servo-control but also for the carrier phase servo-control.

The second loop produces signals Ip2, Qp2, Id2, Qd2 and an error signal $(Ip2.Id2+Qp2.Qd2)/(Ip2^2+Qp2^2)$. It gets locked into the point B of FIG. 6 for which the energy values of early and late correlation are identical.

The sampling of the registers and especially of the phase output of the oscillator 48 is done at the same instant as that of the first loop. It enables the computation of a GPS time T2 which is different from the time T1 if there are multiple paths.

This computation just like that of the time T1 is done by the microprocessor 50 which manages the computations of the PVT (position, velocity, time) point of the GPS receiver.

The computation of T1 and of T2 then enables the computation by extrapolation of the time T0 which enables the computation of the true GPS position devoid of error due to multiple paths.

One drawback of the drawing of FIG. 7 is the need to use practically two digital signal processing channels for an operation of determination pertaining to only one satellite. This drawback can be corrected in two ways. The first way consists, as mentioned further above, in working in time multiplexed mode with successively two delays d and k.d produced by the code generator 22. This makes it necessary to have a time interval te2–te1 that is very well known between the instant te1 where the registers are read after the loop is locked into the delay d and the instant te2 where the registers are read after the loop is locked into the delay k.d. The computation of T0 takes account of this time interval to perform the extrapolation: the first measurement gives a time T1; the second gives a time T'2; the time T'2 is reduced to a time T2 by the formula:

$T2=T'2-(te2-te1)$

Another method consists in carrying out computations of correlation energy value simultaneously with codes P, E1, L1, E2, L2, only the codes E1, L1 (delay d) being used to servo-control the loop, the other codes being used only to compute the correlation energy values.

The extrapolation then consists in finding the temporal position of the point of intersection of two straight-line segments defined by four pairs, each constituted by a correlation energy and the corresponding temporal divergence.

Figure 8:
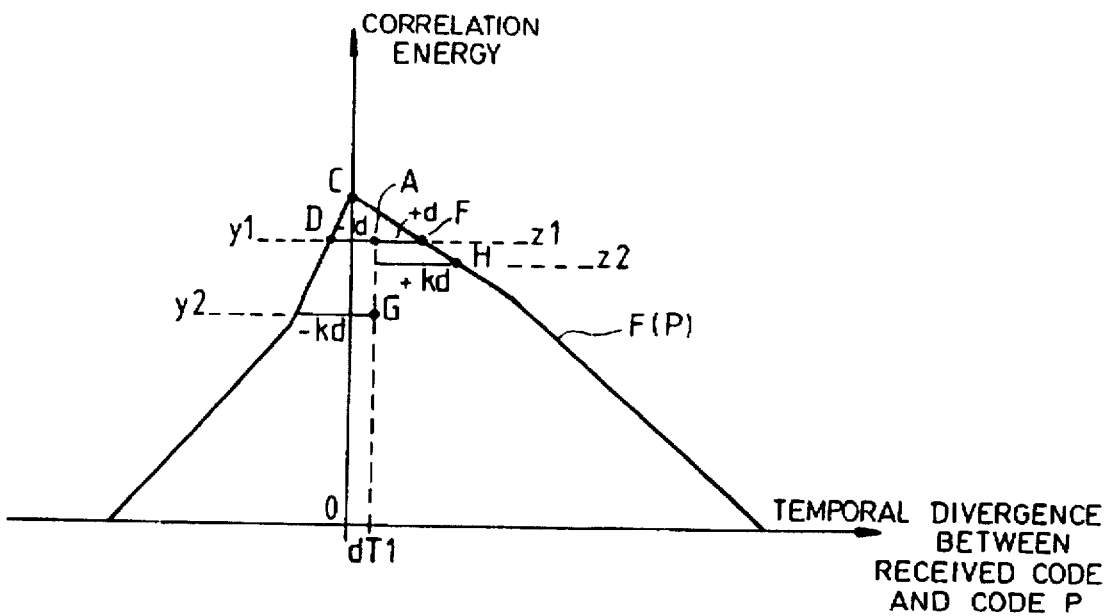
FIG. 8 is an explanatory graph for a second mode of implementation.

This shall be explained first of all with reference to the drawings of FIG. 8 before the description of the embodiment that corresponds to it.

FIG. 8 again shows the energy of correlation between the received signal and the local punctual code P as a function of the temporal divergence between the code present in the received signal and the punctual code P. If early codes E1 and E2 (with advances of d and k.d respectively) and late codes L1 and L2 (with delays of d and k.d respectively) are produced and if the code correlation loop is servo-controlled in such a way that the correlation energy y1=F(E1) is equal to the correlation energy z1=F(L1), then the position taken by the servo-control is the point A of FIG. 8, with a y-axis value y1=z1 and an x-axis value dT1 located at equal distance d from a point D of the early part and a point F of the late part of the correlation curve. The correlation loop gives a measurement of the y-axis value y1 of the point D and of the y-axis value z1 of the point F and makes it possible to provide a measurement of time T1 synchronized with the x-axis value dT1. The x-axis values of the points D and F are dT1−d and dT1+d respectively.

The punctual code is localized at dT1 when the servo-control is set up.

It is then possible, without using a second closed correlation loop, to create a code that is late by k.d (x-axis value dT1+k.d) with respect to the punctual code and a code that is early by k.d (x-axis value dT1−kd) and measure the correlation energy between the received code and these late and early codes. This amounts in FIG. 8 to making a search for:

the point G with the x-axis value (dT1−k.d) and measuring the correlation energy y2 at this point;

the point H with the x-axis value (dT1+k) and measuring the correlation energy z2 at this point.

With the energy values y1, z1, y2, z2, and a measurement of time T1 that is synchronized with the locking point A being known, the extrapolation formula simply entails the computation of the time T0 corresponding to the correlation peak. The peak is at the intersection of the extrapolated segments DG and FH. The formula is the following:

$$T0 = T1 - d(y2-z2)/(y1+z1-y2-z2)$$

Figure 9:
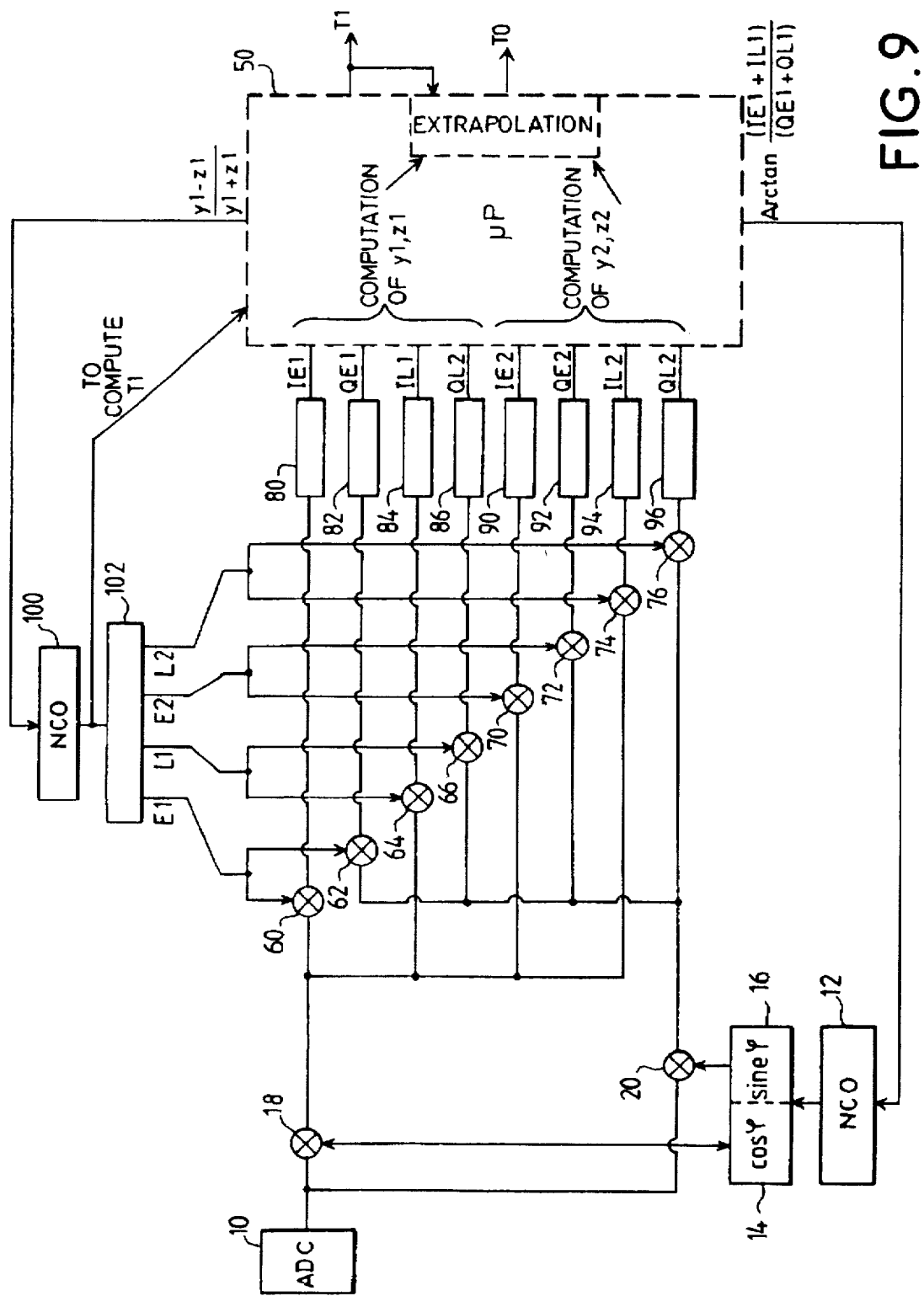
FIG. 9 shows this second mode of implementation.

The drawing of FIG. 9 makes it possible achieve the invention according to this variant of a mode of measurement that makes use of a single code loop servo-control and four different measurements of correlation energy values with different values of advance and delay.

The reconstitution of the carrier in phase and in phase quadrature is done as in FIG. 7 on the basis of a local oscillator 12 generating a carrier phase that varies linearly in sawtoothed form, a sine and cosine computation (14, 16) of this phase and multipliers 18, 20 receiving firstly the digital signal from the satellite coming from the converter 10 and secondly the sine and cosine of the carrier phase.

The sine and cosine paths thus set up are correlated by multipliers 60, 62, 64, 66, 70, 72, 74, 76 respectively with an early code E1 (early by d with respect to a punctual code P) and a late code L1 (late by d), an early code E2 (early by k.d) and a late code L2 (late by k.d).

The outputs of the multipliers are integrated by respective integrators (of the << integrate and dump>> type) 80 to 86 and 90 to 96 respectively, and give the following correlation signals:

IE1, IL1, IE2, IL2 on the cosine channel and QE1, QL1, QE2, QL2 on the sine channel.

The correlation energy values are obtained by computation of the module of the vector I, Q: for example, the energy of correlation with the early code E2 is equal to the following sum of squares: $IE2^2 + QE2^2$.

The computation software that controls the signal processing circuit then computes the following correlation energy values:

$y1 = (IE1^2 + QE1^2)$ which represents the y-axis value of the point D of FIG. 8.

$z1 = (IL1^2 + QL1^2)$ which represents the y-axis value of the point F of FIG. 8, the servo-control being done so that y1=z1.

$y2 = (IE2^2 + QE2^2)$ which represents the y-axis value of the point G.

$z2 = (IL2^2 + QL2^2)$ which represents the y-axis value of the point H.

To carry out the servo-control, a computation is therefore made of the difference between the early and late correlation energy values for the shift d:

$$(y1-z1)/(y1+z1)$$

the term y1+z1 being a standardization term and this difference is used to control the phase of a numerically controlled oscillator 100 that drives a local code generator 102 having several outputs corresponding to the codes E2, E1, L1, L2.

Furthermore, as in FIG. 7, the carrier loop is servo-controlled on the basis of the correlation signals used for the code phase servo-control. Here, it is possible to compute a value Arctan(IE1+IL1)/(QE1+QL1) to use it as an error signal to control the numerically controlled oscillator 12.

The microprocessor for the control and computation of GPS position can compute a GPS time T1 at any instant of measurement when the loop is servo-controlled. This computation is done on the basis of the reading of the oscillator phase 100 at this instant.

It also computes the energy values y1, z1, y2, z2 from the output numerical values of the integrators 80 to 96.

Finally, through the extrapolation formula here above, on the basis of d, y1, z1, y2 and z2, it computes the time T0 sought which may be used for the computation of the exact position GPS corrected for the influence of the multiple paths.

What is claimed is:

1. A method to eliminate the influence of radio frequency wave multiple paths between a satellite and a receiver for determining a position by satellite in which there is used a correlation by means of at least four pseudo-random codes E1, L1, E2, L2 which are the replicas of a code received from a satellite, the codes E1 and L1 being respectively early and late by a duration d with respect to a punctual code P1 and the codes E2 and L2 being respectively early and late by a duration k.d. with respect to a punctual code P2 wherein, in order to deduce the position of the receiver from the temporal position of the code received without error due to multiple paths, measurements are made of correlation energy values and/or of received time, firstly with the replica codes E1, L1 that are early and late by d, and secondly with the replica codes E2, L2 that are early and late by k.d and, on the basis of these two sets of measurements, a computation is carried out, by a simple extrapolation computation, of the temporal position corresponding to k=0 that defines the temporal position of the received code.

2. A method according to claim 1, wherein the punctual codes P1 and P2 are transmitted independently of each other, a first servo-control loop being produced to servo-control the punctual code P1 by an error signal representing the equality of the energy values of the code E1 and of the code L1, and a second correlation loop being produced to servo-link the punctual code P2 by an error signal representing the equality of the energy values of correlation of the code E2 and of the code L2, and wherein a time T1 is computed from the position of the punctual code P1 in the first loop, a time T2 from the position of the punctual code P2 in the second loop, and a corrected time T0 corresponding to the code of the signal received from the satellite is computed by the extrapolation formula $T0=(kT1-T2)/(k31\ 1)$.

3. A method according to claim 2, wherein the two servo-control loops work simultaneously, with two different code generators producing one of the codes P1, E1 and L1, and the other the codes P2, E2 and L2, and wherein the times T1 and T2 are computed by the reading of digital signals within each loop at one and the same instant.

4. A method according to claim 2, wherein the two servo-control loops are constituted during two successive time intervals by means of one and the same servo-control circuit comprising a code generator successively producing first of all a series of codes P1, E1, L1, the computation of the time T1 being done from the reading of digital signals in the servo-control circuit at a first sampling instant te1, and then a series of codes P2, E2, L2, the computation of the time T2 being done first of all by computing a period of time T2 from the reading of digital signals in the servo-control circuit at a second sampling instant te2, and then by subtracting, from the time T'2, the time interval te2−te1 to reduce the time T2 to a value equivalent to the value it would have had if the servo-control loops were to work simultaneously.

5. A method according to any of the claims 2 to 4, wherein a code E1−L1 is produced from the codes E1 and E1, a code E2−L2 is produced from the codes E2 and L2, the servo-controls being set up so as to tend to reduce to zero the function of correlation F(E1−L1) between the code E1−L1 and the code received from a satellite and the function of correlation F(E2−L2) between the code E2−L2 and the code received from a satellite.

6. A method according to claim 1, wherein the two codes P1 and P2 are merged into a single code P, a servo-control loop is set up on the basis of the codes E1 and L1 to servo-control the code P by an error signal representing the equality of the energy values of correlation $y1$ and $z1$ between the received signal and the code E1 on the one hand and the received signal and the code L1 on the other hand, the energy values of correlation $y2$ and $z2$ between the received signal and the codes E2 and L2 respectively are measured, a period of time T1 is computed from the position of the punctual code O on the basis of digital signals sampled in the servo-control loop at a sampling instant, and the time T0 not affected by multiple-path error is computed by the extrapolation formula:

$$T0=T1-d(y2-z2)/(y1+z1-y2-z2).$$

7. A receiver for determining a position by satellite comprising means to generate four pseudo-random codes E1, L1, E2, L2 that are replicas of a code received from a satellite, the codes E1 and L1 being respectively early and late by a duration d with respect to a punctual code P1 and the codes E2 and L2 being respectively early and late by a duration k.d with respect to a punctual code P2, k being different from 1 and 0, wherein it further comprises means of correlation between the received code and the replica codes, means for the measurement of correlation energy values and at least one received time, these means using firstly the replica codes E1 and L1 and secondly the replica codes E2 and L2 and means for the performance, on the basis of these two sets of measurements, of a computation by simple extrapolation of a temporal position corresponding to k=0 that defines the temporal position of the received code.

* * * * *